US010969153B2

(12) United States Patent
Kang

(10) Patent No.: US 10,969,153 B2
(45) Date of Patent: Apr. 6, 2021

(54) VALVE APPARATUS AND HOME APPLIANCE

(71) Applicant: LG ELECTRONICS INC., Seoul (KR)

(72) Inventor: Sangjun Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 104 days.

(21) Appl. No.: 15/995,603

(22) Filed: Jun. 1, 2018

(65) Prior Publication Data

US 2018/0347884 A1  Dec. 6, 2018

(30) Foreign Application Priority Data

Jun. 5, 2017  (KR) .......................... 10-2017-0069732

(51) Int. Cl.
*F25C 5/20* (2018.01)
*F25D 23/12* (2006.01)
(Continued)

(52) U.S. Cl.
CPC ................ *F25C 5/22* (2018.01); *F16K 11/22* (2013.01); *F16K 11/24* (2013.01);
(Continued)

(58) Field of Classification Search
CPC ........ F25C 5/22; F25C 2400/14; F16K 11/24; F16K 11/22; F16K 31/0686;
(Continued)

(56) References Cited

U.S. PATENT DOCUMENTS 3,429,140 A * 2/1969 White ....................... F25C 5/22
62/339
5,135,645 A * 8/1992 Sklenak ................. B01D 29/96
210/117
(Continued)

FOREIGN PATENT DOCUMENTS

KR        10-0420361         3/2004
KR    10-2005-0051231 A     6/2005
(Continued)

OTHER PUBLICATIONS

Translation of KR 10/20050051231 Office Action dated Jan. 26, 2021 (original copy in IDS). Retrieved from Espacenet on Mar. 1, 2021. (Year: 2021).*
Korean Office Action dated Jan. 26, 2021 issued in Application 10-2017-0069732.

*Primary Examiner* — Jessica Cahill
*Assistant Examiner* — Patrick C Williams
(74) *Attorney, Agent, or Firm* — KED & Associates LLP

(57) ABSTRACT

A valve apparatus includes a housing including an inlet and first and second outlets, through which water introduced through the inlet is discharged, a first orifice including an opening communicating with the first outlet and a second orifice including an opening communicating with the second outlet, the first and second orifices being received in the housing, a first plunger for opening and closing the opening of the first orifice; and a second plunger for opening and closing the opening of the second orifice. Each of the orifices includes a rib surrounding the circumference of each of the plungers in a state in which each of the plungers closes the opening of each of the orifices.

18 Claims, 7 Drawing Sheets

(51) Int. Cl.
  *F16K 11/22* (2006.01)
  *F16K 31/06* (2006.01)
  *F16K 11/24* (2006.01)
  *F25D 23/02* (2006.01)
(52) U.S. Cl.
  CPC ...... *F16K 31/0651* (2013.01); *F16K 31/0686* (2013.01); *F16K 31/0693* (2013.01); *F25D 23/028* (2013.01); *F25D 23/12* (2013.01); *F25D 23/126* (2013.01); *F25C 2400/14* (2013.01); *F25D 2323/024* (2013.01); *F25D 2323/121* (2013.01); *F25D 2323/122* (2013.01)
(58) Field of Classification Search
  CPC ............. F16K 31/2651; F16K 31/0693; F25D 23/126; F25D 23/12; F25D 23/028; F25D 2323/122; F25D 2323/024; F25D 2323/121
  See application file for complete search history.

(56) References Cited

U.S. PATENT DOCUMENTS

| | | | | |
|---|---|---|---|---|
| 5,269,333 | A  * | 12/1993 | Richmond | F16K 31/404 137/1 |
| 6,460,367 | B1 * | 10/2002 | Duhack | F16K 31/404 137/883 |
| 7,080,817 | B2 * | 7/2006 | Stern | F16K 31/404 251/129.17 |
| 7,222,642 | B2 * | 5/2007 | DuHack | F16K 31/0651 137/883 |
| 7,284,680 | B2 * | 10/2007 | Farano | F25D 23/126 137/883 |

FOREIGN PATENT DOCUMENTS

| | | |
|---|---|---|
| KR | 10-2007-0025196 A | 3/2007 |
| KR | 10-1519198 | 5/2015 |

* cited by examiner

VALVE APPARATUS AND HOME APPLIANCE

CROSS-REFERENCE TO RELATED APPLICATION(S)

This application claims priority to Korean Patent Application No. 10-2017-0069732 filed in Korea on Jun. 5, 2017, the entire contents of which is hereby incorporated by reference in its entirety.

BACKGROUND

1. Field

The present specification relates to a valve apparatus and a home appliance including the same.

2. Background

The valve apparatus controls flow of fluid and may be used in various home appliances such as refrigerators or water purifiers and in the whole industry.

There are various types of valve apparatuses such as having one inlet and one outlet, having a plurality of inlets and on outlet or having one inlet and a plurality of outlets.

Korean Registered Patent No. 10-1519198, which is Patent Document 1, discloses a refrigerator.

The refrigerator disclosed in Patent Document 1 includes a water purification valve provided in a storage compartment door and the water purification valve is divided into a purified water flow passage and an ice-making flow passage are divided at the rear end thereof.

That is, a three-way valve type water purification valve having one inlet and two outlets is disclosed.

Korean Registered Patent No. 10-0420361, which is Patent Document 2, discloses a solenoid type refrigerant valve.

The refrigerant valve disclosed in Patent Document 2 includes a valve body including a refrigerant inlet and a refrigerant outlet, a coil wound on an outer circumference of an upper portion of the valve body, a plunger provided in the valve to rise by magnetic force generated in the coil, and a magnetic pole provided at an upper portion of the plunger. The plunger rises and falls in the valve body to close or open the refrigerant outlet.

If the valve has two outlets like Patent Document 1, the number of plungers and coils disclosed in Patent Document 2 is two such that the plungers and coils independently operate.

However, if the valve of Patent Document 2 is applied to Patent Document 1, in a state in which one outlet (referred to as a first outlet) is closed by any one plunger (referred to as a first plunger) and the other outlet (referred to as a second outlet) is opened, when the other plunger (referred to as a second plunger) falls to close the second outlet, the internal pressure of the valve body increases and the increased pressure acts on the first plunger. In this case, the first plunger rises by the pressure, such that fluid discharged through the first outlet.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
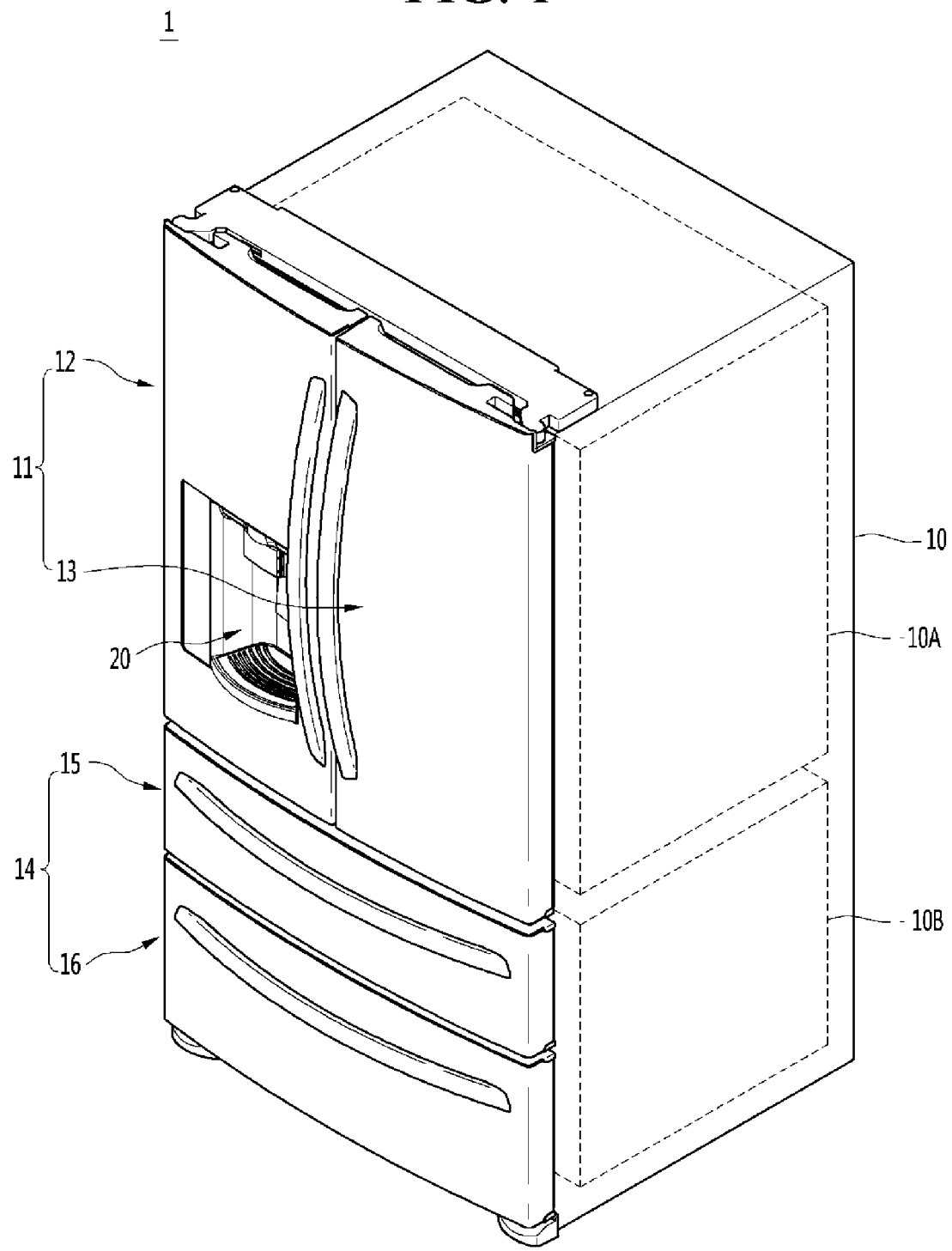
FIG. 1 is a perspective view of a home appliance according to an embodiment of the present invention.
Figure 2:
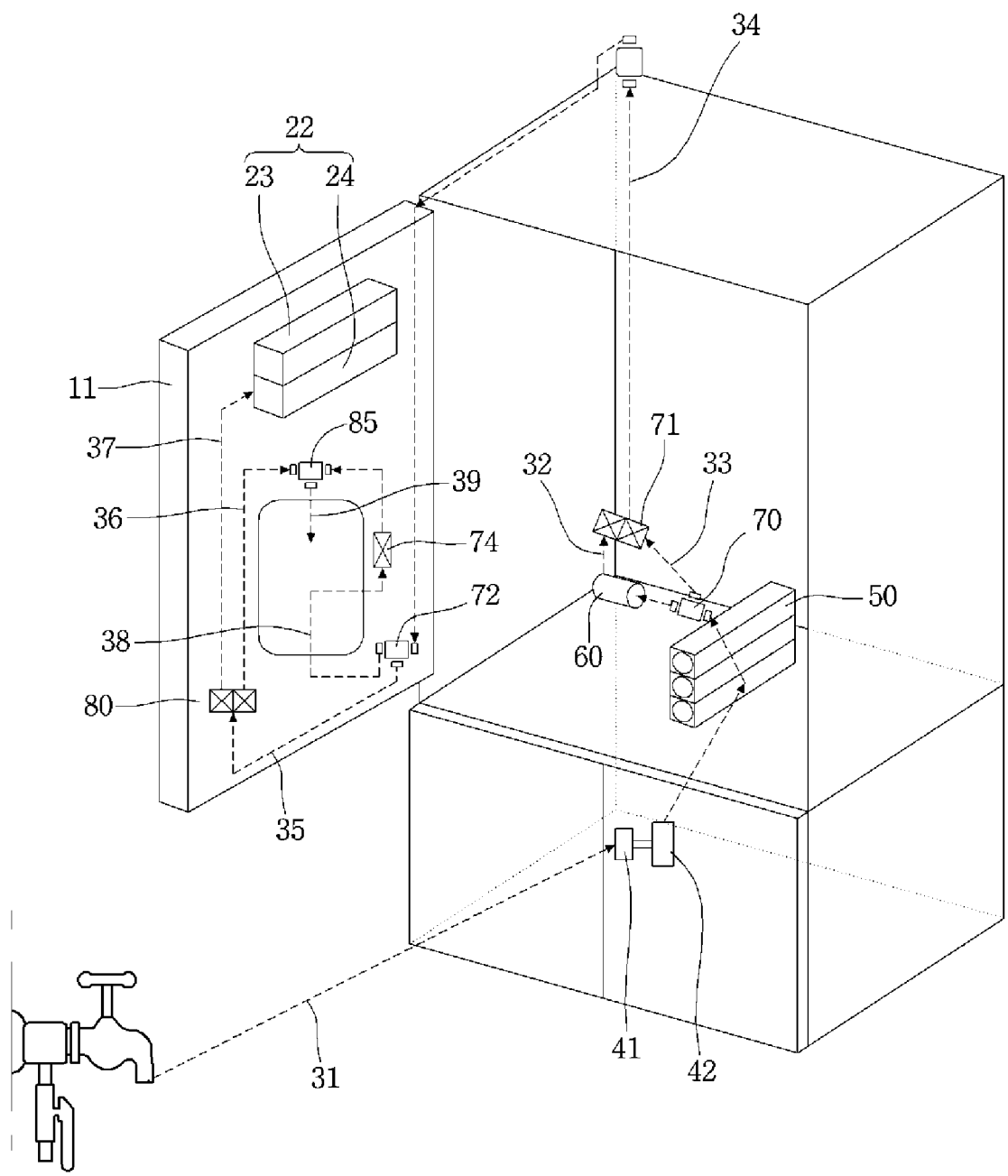
FIG. 2 is a view showing flow of water in a home appliance according to an embodiment of the present invention.
Figure 3:
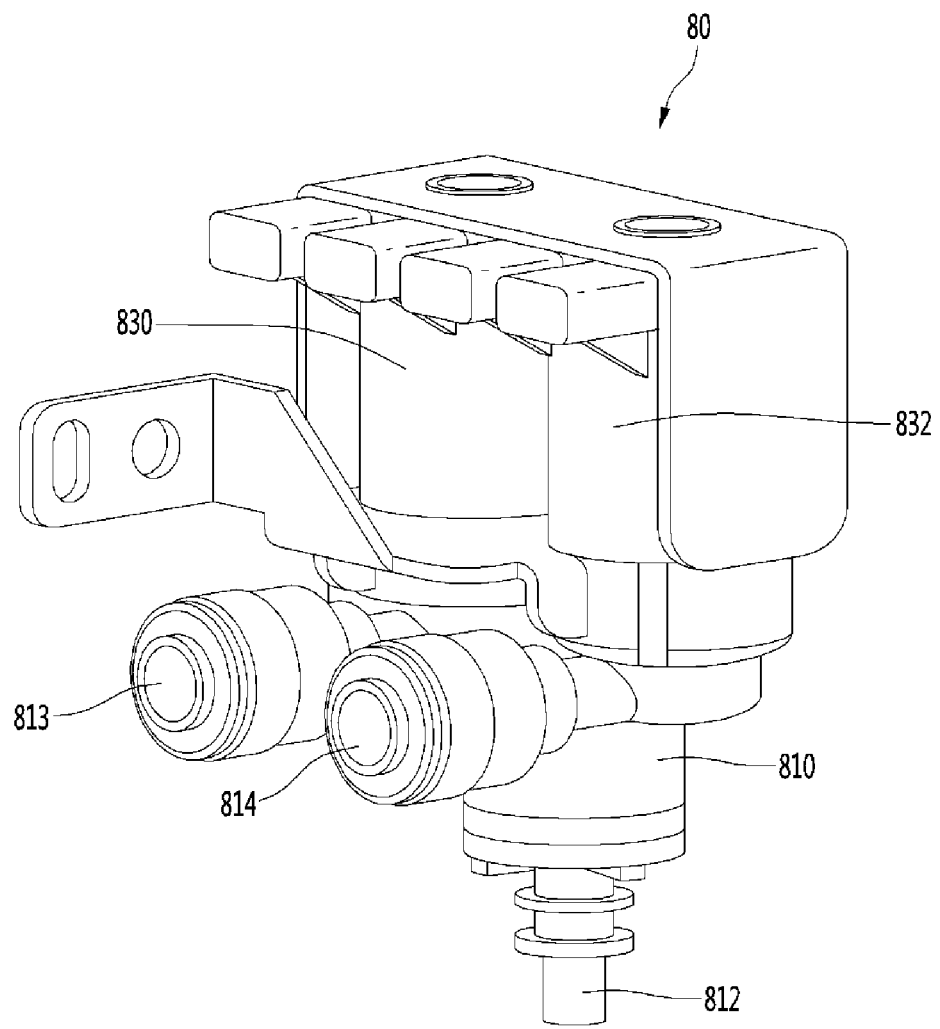
FIG. 3 is a view showing a valve apparatus according to an embodiment of the present invention.

FIG. 1 is a perspective view of a home appliance according to an embodiment of the present invention, FIG. 2 is a view showing flow of water in a home appliance according to an embodiment of the present invention, and FIG. 3 is a view showing a valve apparatus according to an embodiment of the present invention.

FIG. 1 shows a refrigerator as an example of a home appliance.

Referring to FIGS. 1 to 3, the refrigerator 1 according to the embodiment of the present invention may include a main body 10 including a storage compartment and a storage compartment door connected to the main body 10 through a hinge to open and close the storage compartment.

The storage compartment may include a refrigerating compartment 10A and a freezing compartment located below the freezing compartment 10a.

The storage compartment door may include a refrigerating compartment door 11 for opening and closing the refrigerating compartment 10A and a freezing compartment door 14 connected to the main body 10 slidably or through a hinge to open and close the freezing compartment 10B.

The refrigerating compartment door 11 may include a first refrigerating compartment door 12 and a second refrigerating compartment door disposed in a horizontal direction. A dispenser 20 for taking out water and ice may be provided in at least one of the first refrigerating compartment door 12 and the second refrigerating compartment door 13.

The freezing compartment door 14 may include a first freezing compartment door 15 and a second freezing compartment door 16 disposed in a vertical direction. Alternatively, one freezing compartment door 14 may open and close the freezing compartment 10B or a plurality of freezing compartment doors may be disposed in a horizontal direction to open and close the freezing compartment 10B.

The refrigerating compartment door 11 may include an ice making device 22. The ice making device 22 may include an ice maker 23 for automatically receiving water and making and moving ice and an ice bank 24 provided below the ice maker 23 to store the ice moved from the ice maker 23.

The main body 10 is provided with a filter device 50 for purifying water supplied by an external water supply source and a water tank 60 for storing water purified by the filter device 50 and cooled by cool air in the storage compartment.

In order to supply water to the dispenser 20 and the ice maker 23, the refrigerator 1 may be connected to the external water supply source. A water supply passage connected to the water supply source, the filter device 50, the water tank 60, the dispenser 20 and the ice maker 23 to guide flow of water may be provided in the main body 10 and the refrigerating compartment door 11.

The filter device 50 may include a plurality of filters and the water tank 60 may be disposed in a direction intersecting the extension direction of the plurality of filters.

The water supply passage may include a supplied water flow passage 31 connecting the water supply source provided outside the main body 10 with the filter device 50 provided in the main body 10, a main-body purified water flow passage 33 (referred to as a first purified water flow passage) in which water purified by the filter device 50 flows, a main-body cold water flow passage (referred to as a first cold water flow passage) in which water purified by the filter device 50 flows and which is connected to the water tank 60, and a common flow passage 34 (referred to as a first common flow passage) for guiding water in the main-body purified water flow passage 33 or the main-body cold water flow passage 32 to the refrigerating compartment door 11.

A first branch portion 70 is provided on the downstream side of the filter device 60 and the main-body cold water flow passage 32 and the main-body purified water flow passage 33 are connected to the first branch portion 70.

In addition, the main-body cold water flow passage 32 and the main-body purified water flow channel 33 are connected to a flow control valve 71. The common flow passage 34 is connected to the flow control valve 71.

Accordingly, cold water stored in the water tank 60 may flow in the common flow passage 34 or purified water in the main-body purified water flow channel 33 may flow into the common flow passage 34, under control of the flow control valve 71.

The common flow passage 34 may be introduced into the refrigerating compartment door 11 through the hinge of the refrigerating compartment door 11.

The water supply passage may include some or all of a door purified water flow passage 35 (referred to as a second purified water flow passage) for receiving purified water from the common flow passage 35, a door cold water flow passage 38 (or referred to as a second cold water flow passage) for receiving cold water from the common flow passage 34, a purified water branch flow passage 36 in which purified water to be taken out flows, an ice-making flow passage 37 for supplying purified water to the ice maker 23 and a takeout flow passage 39 (referred to as a second common flow passage) for taking out purified water or cold water.

The common flow passage 34, the door cold water flow passage 38 and the door purified water flow passage 35 may be connected to a second branch portion 72.

The purified water branch flow passage 36, the ice-making flow passage 37 and the door purified water flow passage 35 may be connected to a valve apparatus 80.

The door cold water flow passage 38 is provided with a cold water control valve 74 and an end of the door cold water flow passage 38, an end of the purified water branch flow passage 36 and the takeout flow passage 39 may be connected to a connector 85.

Flow of water in the refrigerator according to the present embodiment will be briefly described.

Water supplied by the external water supply source may be purified while passing through the filter device 50 and some of the purified water may be introduced into the water tank 60. When a cold water takeout command is input, the cold water control valve 74 is turned on. The flow control valve 71 operates to discharge water in the water tank 60 such that cold water stored in the water tank 60 passes through the flow control valve 71.

Next, cold water is introduced into the refrigerating compartment door 11 along the common flow passage 34. Cold water introduced into the refrigerating compartment door 11 flows into the door cold water flow passage 38 through the second branch portion 72. Cold water may be discharged through the cold water control valve 74 and the takeout flow passage 39.

When a purified water takeout command is input, the flow control valve 71 operates to discharge water in the main-body purified water flow channel 33, such that purified water stored in the main-body purified water flow channel 33 passes through the flow control valve 71.

Next, the purified water is introduced into the refrigerating compartment door 11 along the common flow passage 34. The purified water introduced into the refrigerating compartment door 11 flows to the door purified water flow passage 35 through the second branch portion 72.

The purified water flowing to the door purified water flow passage 35 flows to the purified water branch flow passage 36 by the valve apparatus 80, thereby being discharged through the takeout flow passage 39.

At this time, when supply of water to the ice maker 23 is required, the purified water in the door purified water flow passage 35 may flow to the ice-making flow passage 37 by the valve apparatus 80 and the purified water flowing in the ice-making flow passage 37 may be supplied to the ice maker 23.

Meanwhile, the valve apparatus 80 may include a housing 810 forming a flow passage therein. The housing 810 may include an inlet 812 and a plurality of outlets 813 and 814.

For example, the plurality of outlets 813 and 814 may include a first outlet 813 and a second outlet 814.

The first outlet 813 may be connected to any one of the purified water branch flow passage 36 and the ice-making flow passage 37 and the second outlet 814 may be connected to the other of the purified water branch flow passage 36 and the ice-making flow passage 37.

The plurality of outlets 813 and 814 may extend in parallel and the inlet 812 and the plurality of outlets 813 and 814 may be disposed such that a direction in which water is introduced through the inlet 812 and a direction in which water is discharged through the outlets 813 and 814 cross each other.

For example, the inlet 812 may extend in a vertical direction and the outlets 813 and 814 may extend in a horizontal direction.

The valve apparatus 80 may include a plurality of drivers 830 and 832 for individually operating a plurality of plungers (described below) provided therein.

Hereinafter, the valve apparatus 80 will be described in greater detail.

Figure 4:
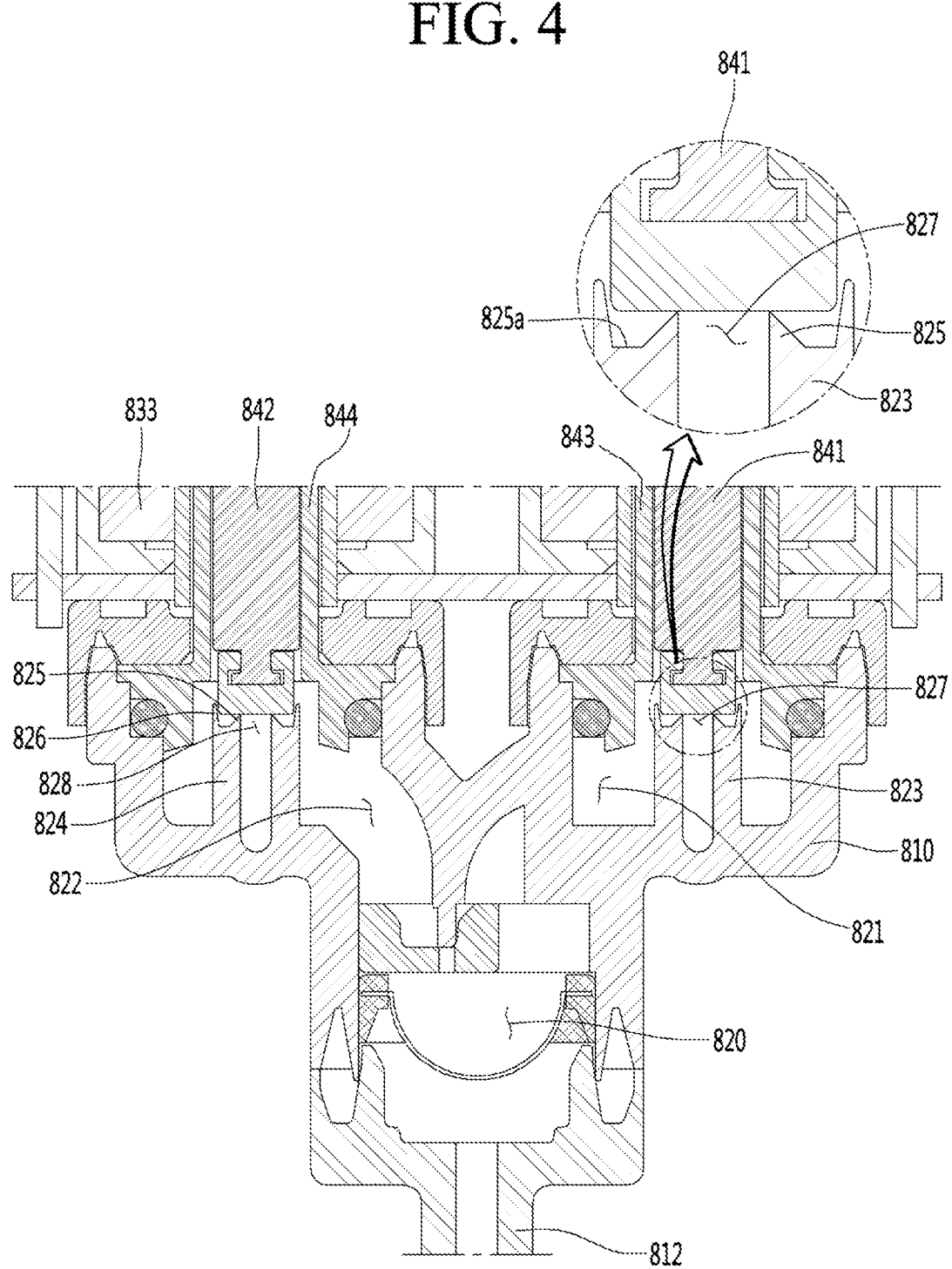
FIG. 4 is a longitudinal cross-sectional view of a valve apparatus according to an embodiment of the present invention.
Figure 5:
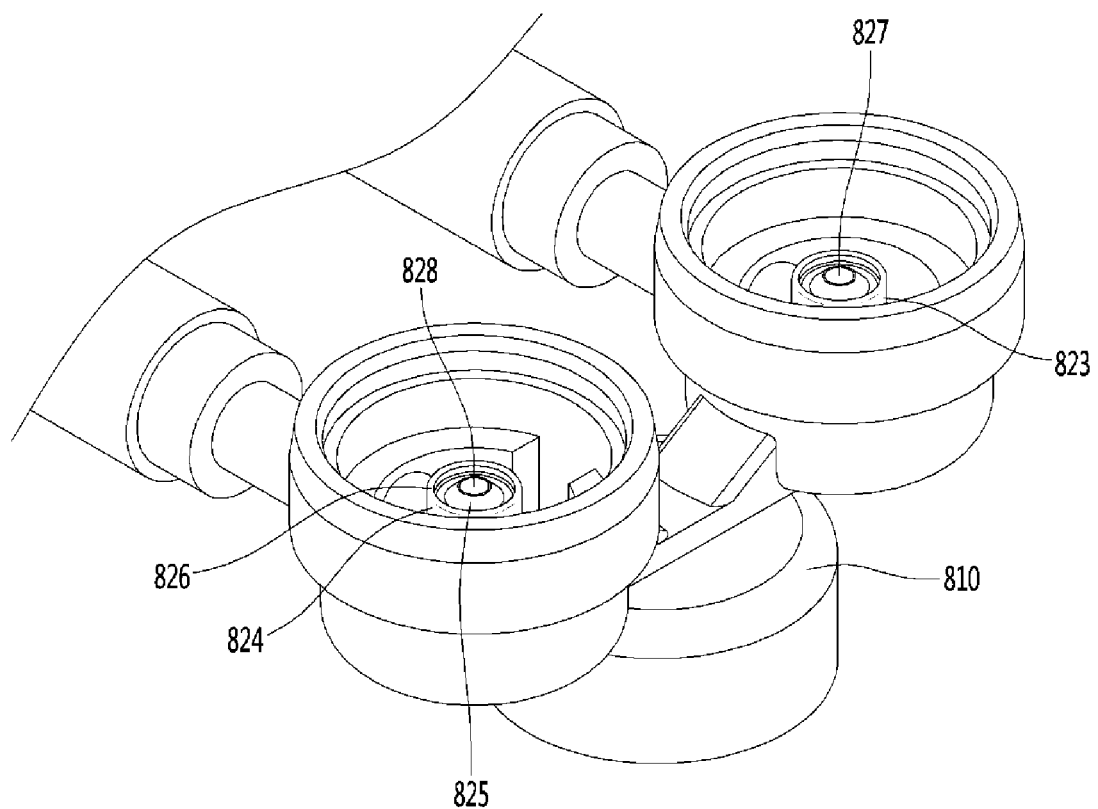
FIG. 5 is a perspective view of a housing according to an embodiment of the present invention.

FIG. 4 is a longitudinal cross-sectional view of a valve apparatus according to an embodiment of the present invention, and FIG. 5 is a perspective view of a housing according to an embodiment of the present invention.

Referring to FIGS. 3 to 5, the inlet 812 may be located at a lower side of the housing 810 and the plurality of outlets 813 and 814 may be located at a higher position than the inlet 812. The outlets 813 and 814 may extend at the lateral side of the housing 810.

The housing 810 may include a main flow passage 820 and first and second branch flow passages 821 and 822 branched from the main flow passage 820.

In addition, the housing 810 may include a first orifice 823, through which water in the first branch flow passage 821 is introduced, and a second orifice 824, through which water in the second branch flow passage 822 is introduced.

The orifices 823 and 824 may be formed in a cylindrical shape to form a flow passage therein and may be extended in a vertical direction.

Openings 827 and 828, through which water is introduced, may be formed in the first surfaces 825a of the orifices 823 and 824. The first surfaces 825a may be the upper surfaces of the orifices 823 and 824 and face the plungers 841 and 842.

In addition, the flow passage in the first orifice 823 communicates with the first outlet 813 and the flow passage of the second orifice 824 communicates with the second outlet 814.

The housing 810 may include a first plunger 841 for opening and closing the opening 827 of the first orifice 823 and a second plunger 842 for opening and closing the opening 828 of the second orifice 824. A first guide 843 receives the first plunger 841 and a second guide 844 receives the second plunger 842.

The plungers 841 and 842 may be moved in the housing 810 in a vertical direction. At this time, the driver 830 and 932 may respectively include coils 833 and each of the plungers 841 and 842 may be a magnetic body. Each of the plungers 841 and 842 may independently rise by magnetic force generated when current flows in the coil 833.

Although not shown, elastic members are provided on the plungers 841 and 842 and, when current applied to the coils 833 is cut off, the plungers 841 and 842 may fall by the elastic forces of the elastic members.

In a state in which current is not applied to the coils 833 of the drivers 830 and 832, the plungers 841 and 842 are respectively brought into contact with the orifices 823 and 824 by the elastic forces of the elastic members to close the openings 827 and 828 of the orifices 823 and 824.

At this time, at least some of the plungers 841 and 842 may be formed in a cylindrical shape, for example, and the diameters of the cylindrical portions of the plungers 841 and 842 may be greater than those of the openings 827 and 828 of the orifices 823 and 824.

Contact portions 825 may be provided in the first surfaces 825a of the orifices 823 and 824 such that the contact areas between the plungers 841 and 842 and the orifices 823 and 824 may be reduced to prevent water from leaking through the orifices 823 and 824.

The contact portions 825 may protrude upward from the edges of the openings 827 and 828 on the first surfaces 825a of the orifices 823 and 824. The contact portions 825 may be continuously formed in the circumferential direction at the edges of the openings 827 and 828.

At this time, as the contact portions 825 extend upward (or toward the plungers), the thicknesses of the contact portions 825 may be reduced.

The outer diameters of the upper ends of the contact portions 825 may be less than those of the lower ends of the plungers 841 and 842.

Accordingly, one surfaces (for example, the lower surfaces) of the plungers 841 and 842 may be in line contact with the ends (for example, the upper ends) of the contact portions 825.

If the one surfaces of the plungers 841 and 842 are in line contact with the ends of the contact portions 825, it is possible to reduce noise generated when the plungers 841 and 842 fall to be brought into contact with the contract portions 825.

In addition, since the thicknesses of the lower sides of the contact portions 825 are greater than those of the upper sides of the contact portions 825, it is possible to prevent the contact portions 825 from being damaged by impact generated when the plungers 841 and 842 fall to be brought into contact with the contact portions 825.

Meanwhile, according to operation of the valve apparatus 80, the first plunger 841 and the second plunger 842 may close the openings 827 and 828 of the orifices 823 and 824 or one of the plungers 841 and 842 may open the opening 827 or 828 of the orifice 823 or 824.

Figure 6:
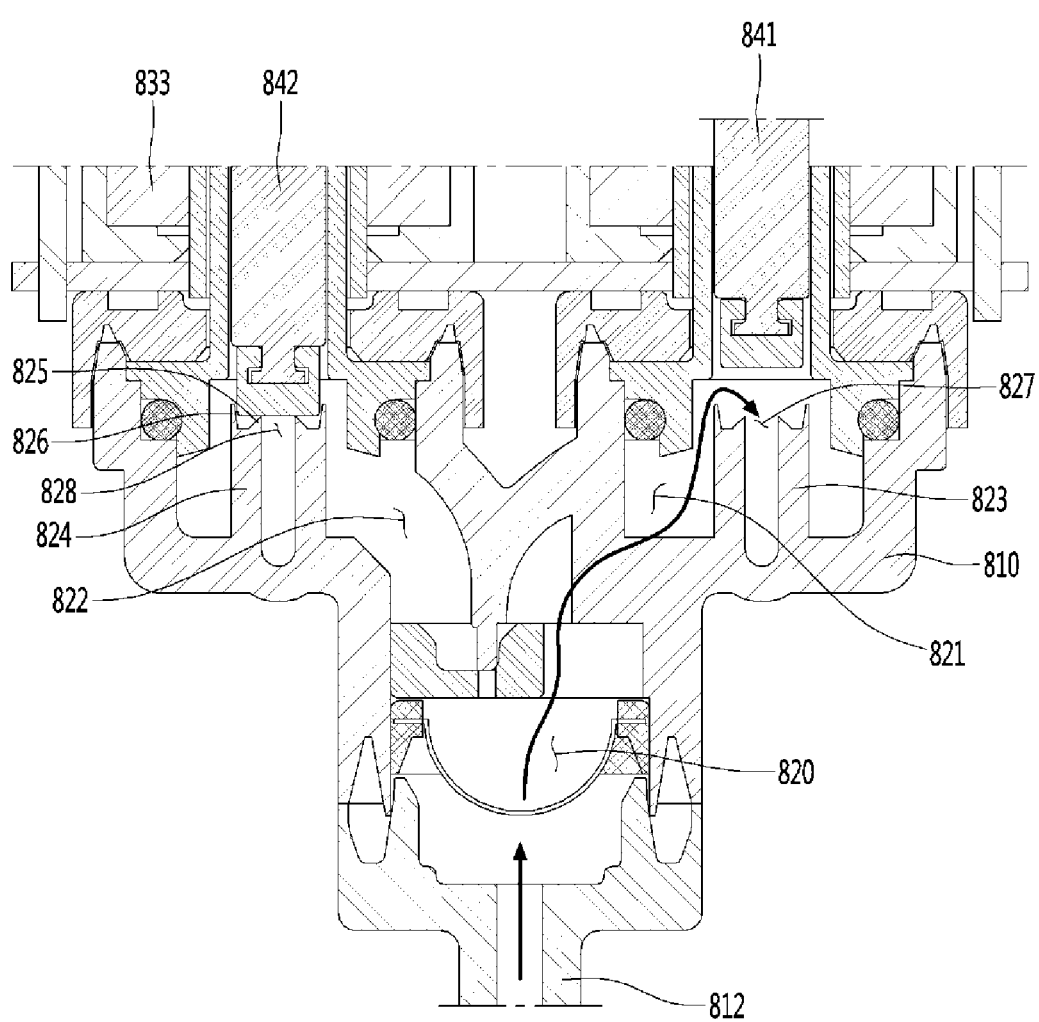
FIG. 6 is a view showing flow of water in a housing in a state in which a first outlet is opened and a second outlet is closed.
Figure 7:
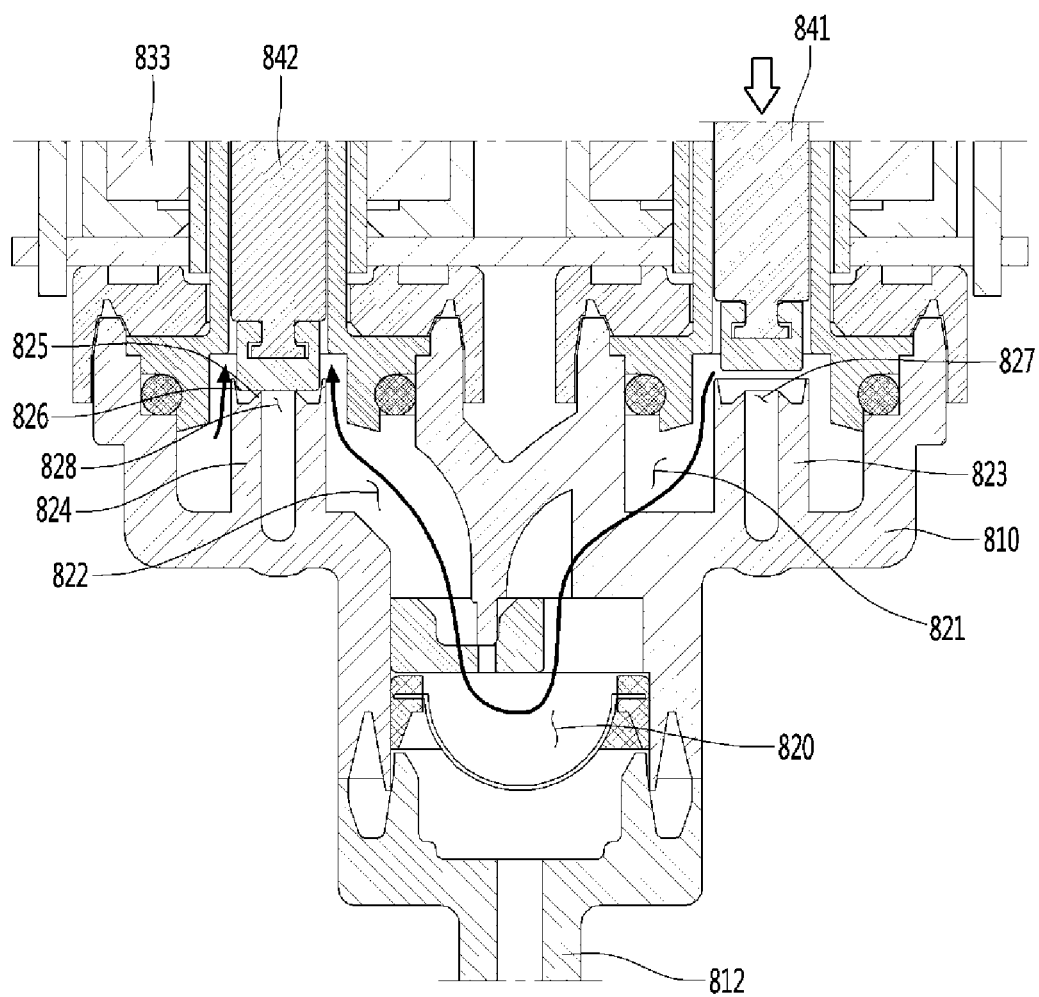
FIG. 7 is a view showing pressure in a housing when a first plunger falls in order to close a first outlet in a state of closing a second outlet.

FIG. 6 is a view showing flow of water in the housing in a state in which the first outlet is opened and the second outlet is closed, and FIG. 7 is a view showing pressure in the housing when the first plunger falls in order to close the first outlet in a state of closing the second outlet.

An arrow shown in FIG. 6 denotes the movement path of water and an arrow shown in FIG. 7 denotes a direction in which water pressure is applied.

Referring to FIGS. 3 to 7, the plungers 841 and 842 located above the orifices 823 and 824 and the inlet 812 and the main flow passage 820 may be located under the orifices 823 and 824.

When one of the openings 827 and 828 of the orifices 823 and 824 is opened by the plungers 841 and 842, water introduced through the inlet 812 rises along the main flow passage 820 and the branch flow passages 821 and 822. Water flows toward the upper surfaces of the orifices 823 and 824, thereby being introduced into the orifices 823 and 824 through the opened openings 827 and 828.

According to the structure for the flow of water in the housing 810, for example, as shown in FIG. 7, in a state in which the opening 827 of the first orifice 823 is opened, when the first plunger 841 falls in order to close the opening 827, the internal pressure of the housing 810 is increased. Then, the increased pressure may act on the second plunger 842 and the second orifice 824.

When pressure increased when the first plunger 841 closes the first orifice 823 directly acts on the second plunger 842 (and vice versa), the second plunger 842 unintentionally rises to open the second orifice 824.

If the second orifice 824 is opened, water is discharged from the second outlet 814. Then, water may be unintentionally discharged from the purified water branch flow passage 36 or the ice-making flow passage 37.

Accordingly, in the present embodiment, in order to prevent such a phenomenon, ribs 826 for blocking pressure may be provided in the orifices 823 and 824.

Specifically, the ribs 826 may be provided on the first surfaces 825a of the orifices 823 and 824.

For example, the ribs 826 may protrude from the first surfaces 825a of the orifices 823 and 824. The ribs 826 may extend upward in the figure at positions spaced apart from the contact portions 825 at the outer circumferences of the contact portions 825.

For example, the ribs 826 may extend upward from the edges of the first surfaces 825a of the orifices 823 and 824. The ribs 826 may be continuously formed in the circumferential direction on the edges of the orifices 823 and 824.

In addition, the minimum inner diameter of portions of the ribs 826 located at a higher position than the contact portions 825 may be greater than the outer diameters of the plungers 841 and 842 such that interference with the ribs 826 is not caused when the plungers 841 and 842 fall.

Accordingly, as shown in FIG. 4, the plungers 841 and 842 may be brought into contact with the contact portions 825 and, in this state, the inner circumferential surfaces of the ribs 826 may be spaced apart from the outer circumferential surfaces of the plungers 841 and 842.

In addition, in a state in which the plungers 841 and 842 are in contact with the contact portions 825, the heights of the upper ends of the ribs 826 from the first surfaces 85a are higher than those of the lower surfaces of the plungers 841 and 842. Accordingly, in a state in which the plungers 841 and 842 are in contact with the contact portions 825, the ribs 826 surround the circumferences of the lower ends of the plungers 841 and 842.

Hereinafter, pressure blocking operation by the ribs will be described.

First, for example, as shown in FIG. 6, when water needs to be discharged through the first outlet 813, current is applied to the coil of the first driver 830.

When current is applied to the coil of the first driver 830, the first plunger 841 rises and the opening 87 of the first orifice 823 is opened.

In this case, water introduced through the inlet 812 flows to the main flow passage 820 and the first branch flow passage 821 and passes through the opening 827 of the first orifice 823, thereby being discharged through the first outlet 813.

In this state, when a command for closing the first outlet 813 is input, current applied to the coil of the first driver 830 is cut off. Then, the first plunger 841 falls by the elastic force of the elastic member to be brought into contact with the contact portion 825 of the first orifice 823, thereby closing the opening of the first orifice 823.

At this time, since water is present in the housing 810, as shown in FIG. 7, the internal pressure (water pressure) of the housing 810 is applied to the second plunger 842.

Specifically, the internal water pressure of the housing 810 is applied upward from the lower side of the second plunger 842.

In the present embodiment, since the rib 826 is disposed to surround the circumference of the lower end of the second plunger 842, water pressure is first applied to the rib 826 and is then applied to a portion of the second plunger 812 located at a higher position than the rib 826 and the lower surface of the second plunger 842.

At this time, water pressure applied to the portion of the second plunger 812 located at the higher position than the rib 826 and the lower surface of the second plunger 842 is less than water pressure directly applied to the rib 826, it is possible to prevent the second plunger 842 from rising by water pressure. That is, the rib 826 prevents water pressure from being directly applied to the second plunger 842.

On the assumption that the rib 826 is not present, water pressure is directly applied to the lower surface of the second plunger 812 at the circumference side of the contact portion 825, the second plunger 842 may rise. However, according to the present embodiment, such a phenomenon can be prevented by the rib 826.

According to the proposed embodiments, it is possible to prevent water pressure, which is generated when any one plunger closes the opening of the orifice, from being directly applied to the other plunger by the rib surrounding the circumference of the plunger.

In addition, by forming the rib on the circumference of the plunger, since water is prevented from leaking when the plunger operates, a structure for preventing water from leaking is simple.

Although a refrigerator in which a refrigerating compartment is located on a freezing compartment is disclosed, the present invention is not limited thereto and the valve apparatus of the present invention is applicable to a refrigerator in which a freezing compartment and a refrigerating compartment are horizontally disposed and a refrigerator in which a freezing compartment is located on a refrigerating compartment. In addition, the valve apparatus of the present invention is applicable to various home appliances including a water purifier for controlling flow of fluid, in addition to the refrigerator.

The present embodiment provides a valve apparatus capable of, by pressure generated when any one of a plurality of plungers closes an outlet, preventing the closed outlet from being opened by another plunger, and a home appliance including the same.

The present embodiment provides a valve apparatus capable of preventing water from leaking in a process of operating a plunger by a simple structure, and a home appliance including the same.

A valve apparatus according to an aspect includes a housing including an inlet and first and second outlets, through which water introduced through the inlet is discharged, a first orifice including an opening communicating with the first outlet and a second orifice including an opening communicating with the second outlet, the first and second orifices being received in the housing, a first plunger for opening and closing the opening of the first orifice; and a second plunger for opening and closing the opening of the second orifice. Each of the orifices includes a rib surrounding the circumference of each of the plungers in a state in which each of the plungers closes the opening of each of the orifices.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A valve apparatus comprising:
    a housing having an inlet, a first outlet and a second outlet;
    a first orifice having a first opening to communicate with the first outlet;
    a second orifice having a second opening to communicate with the second outlet, the first and second orifices being provided in the housing;
    a first plunger to open and close the first opening of the first orifice, and including a first body portion and a first lower portion coupled to a lower end portion of the first body portion; and
    a second plunger to open and close the second opening of the second orifice,
    wherein the first orifice includes a first contact portion to contact a bottom surface of the first lower portion of the first plunger and a first rib that surrounds a circumference of the first lower portion of the first plunger when the first opening of the first orifice is closed by the first plunger,
    wherein an upper end of the first rib is positioned lower than an upper end of the first lower portion,
    wherein the upper end of the first rib is positioned higher than an upper end of the first contact portion;
    a recessed portion is defined between an inner periphery of the first rib and an outer periphery of the first contact portion, and
    an outer diameter of the first orifice is equal to an outer diameter of the first rib.

2. The valve apparatus of claim 1, wherein the second plunger comprises a second body portion and a second lower portion coupled to a lower end portion of the second body portion, the second orifice includes a second contact portion to contact a bottom surface of the second lower portion of the second plunger and a second rib that surrounds a circumference of the second lower portion of the second plunger when the second opening of the second orifice is closed by the second plunger.

3. The valve apparatus of claim 1,
    wherein the first orifice includes a first surface that faces the first plunger, and the first rib protrudes from the first surface of the first orifice.

4. The valve apparatus of claim 3,
    wherein an inner diameter of at least one portion of the first rib is greater than an outer diameter of the first lower portion of the first plunger such that an inner surface of the first rib is spaced apart from the circumference of the first lower portion of the first plunger.

5. The valve apparatus of claim 4,
    wherein the first surface of the first orifice is an upper surface of the first orifice, and
    wherein the upper end of the first rib is located at a higher position than the bottom surface of the first lower portion of the first plunger when the first opening of the first orifice is closed by the first plunger.

6. The valve apparatus of claim 1,
    wherein the first orifice includes a first surface that faces the first plunger, and the first contact portion protrudes from the first surface of the first orifice.

7. The valve apparatus of claim 6,
    wherein the first contact portion is continuously provided at an edge of the first opening.

8. The valve apparatus of claim 6,
    wherein the first contact portion is at the first surface of the first orifice such that a thickness of the first contact portion is reduced toward the first plunger and an end of the first contact portion is in contact with the bottom surface of the first lower portion of the first plunger.

9. The valve apparatus of claim 6,
    wherein a height of the first rib protruding from the first surface of the first orifice is higher than a height of the first contact portion protruding from the first surface of the first orifice.

10. The valve apparatus of claim 6,
    wherein when the first plunger contacts the first contact portion, a height of the upper end of the first rib from the first surface of the first orifice is higher than a height of a lower surface of the first plunger from the first surface of the first orifice.

11. The valve apparatus of claim 6,
    wherein a minimum inner diameter of a portion of the first rib provided at a higher position of the bottom surface of the first lower portion of the first plunger is greater than an outer diameter of the first plunger.

12. The valve apparatus of claim 1,
    wherein the inlet is located at a lower portion of the housing, and
    wherein the first and second outlets are located at a higher position than the inlet.

13. A home appliance comprising the valve apparatus of claim 1.

14. The home appliance of claim 13, comprising:
a body having a storage compartment;
a door connected to the body by a hinge;
an ice maker device to couple to the first outlet of the valve apparatus; and
a dispenser to couple to the second outlet of the valve apparatus.

15. A valve apparatus comprising:
a housing having an inlet, a first outlet and a second outlet;
a first orifice having a first opening to couple with the first outlet;
a second orifice having a second opening to couple with the second outlet, the first and second orifices being provided at the housing;
a first plunger to move relative to the first orifice to open the first opening and to move relative to the first orifice to close the first opening of the first orifice, and including a first body portion and a first lower portion coupled to a lower end portion of the first body portion;
a first guide to receive the first plunger; and
a second plunger to move relative to the second orifice to open the second opening and to move relative to the second orifice to close the second opening of the second orifice,
wherein the first orifice includes a first surface, a first contact portion, and a first rib that extends from the first surface, the first contact portion is in contact with a bottom surface of the first lower portion and the first rib to be provided at an outer circumference of the first lower portion of the first plunger when the first opening of the first orifice is closed by the first plunger, wherein an upper end of the first rib is located at a higher position than the bottom surface of the first lower portion of the first plunger when the first opening is closed by the first plunger,
wherein the upper end of the first rib is positioned lower than an upper end of the first lower portion, and
wherein an outer diameter of the first rib is less than an inner diameter of the first guide, and the first rib is spaced apart from the first guide.

16. The valve apparatus of claim 15, wherein the second plunger comprises a second body portion and a second lower portion coupled to a lower end portion of the second body portion, the second orifice includes a second surface, a second contact portion, and a second rib that extends from the second surface, the second contact portion is in contact with a bottom surface of the second lower portion and the second rib to be provided at another surface of the second plunger when the second opening of the second orifice is closed by the second plunger.

17. The valve apparatus of claim 15, wherein an inner diameter of a portion of the first rib is greater than an outer diameter of the first lower portion of the first plunger such that an inner surface of the first rib is spaced apart from an outer circumference of the first lower portion of the first plunger.

18. A home appliance comprising the valve apparatus of claim 15.

* * * * *